US012522074B2

(12) United States Patent
Myers et al.

(10) Patent No.: US 12,522,074 B2
(45) Date of Patent: Jan. 13, 2026

(54) ELECTRIC WORK MACHINE WITH A SYSTEM AND METHOD OF CONSERVING POWER

(71) Applicant: Deere & Company, Moline, IL (US)

(72) Inventors: David J. Myers, Cedar Falls, IA (US); Thomas M. Johnson, Cedar Falls, IA (US); Aaron J. Fischer, Fargo, ND (US); Timothy J. Kilworth, Waverly, IA (US); Brent A. Smith, Peosta, IA (US); Daniel Woelk, Frankenthal (DE); Scott J. Petersen, Bettendorf, IA (US); Mansi S. Shah, Oak Brook, IL (US); Benjamin J. Ahrens, Hawley, MN (US); Beau Hackney, Holly Springs, NC (US)

(73) Assignee: DEERE & COMPANY, Moline, IL (US)

( * ) Notice: Subject to any disclaimer, the term of this patent is extended or adjusted under 35 U.S.C. 154(b) by 173 days.

(21) Appl. No.: 18/449,821

(22) Filed: Aug. 15, 2023

(65) Prior Publication Data

US 2025/0058635 A1 Feb. 20, 2025

(51) Int. Cl.
*B60L 1/00* (2006.01)
*B60L 58/12* (2019.01)
*E02F 9/20* (2006.01)

(52) U.S. Cl.
CPC .............. *B60L 1/003* (2013.01); *B60L 58/12* (2019.02); *E02F 9/2095* (2013.01); *B60L 2200/40* (2013.01)

(58) Field of Classification Search
CPC ..... Y02D 10/00; G06F 1/3203; G06F 1/3206; G06F 1/3212; G06F 1/3231;
(Continued)

(56) References Cited

U.S. PATENT DOCUMENTS 5,330,385 A * 7/1994 Hotta ................. B60H 1/00735
236/1 R
6,879,261 B2 4/2005 Nishino et al.
(Continued)

FOREIGN PATENT DOCUMENTS

CA 2550528 A1 * 12/2007 ............. B60R 16/03
DE 102008019069 A1 6/2009
(Continued)

OTHER PUBLICATIONS

Machine Translation of DE 102010051963 A1 (Year: 2012).*
German Search Report issued in application No. 102024120010.3 dated Mar. 19, 2025, 26 pages.

*Primary Examiner* — Scott A Browne
*Assistant Examiner* — Jisun Choi (57) ABSTRACT

A work machine comprises of a cab, a battery, an auxiliary operations system, a cab occupant sensor and a controller. The auxiliary operations system is operatively coupled to the battery. The cab occupant sensor is operable to sense data associated with an occupancy of the cab by an operator. The control is communicatively coupled to the cab occupant sensor and comprises of a processor, and a memory having a power conserving algorithm thereon. The processor is operable to execute a power conserving algorithm to identify a cab inoccupancy condition from data related to an occupancy of the cab, and automatically initiates a low power mode by derating the auxiliary operations system a first degree when the cab inoccupancy condition is fulfilled.

11 Claims, 5 Drawing Sheets

(58) Field of Classification Search
CPC .... G06F 1/3215; G06F 1/3287; G06F 1/3243;
B60W 50/035
See application file for complete search history.

(56) References Cited

U.S. PATENT DOCUMENTS

| | | | |
|---|---|---|---|
| 7,966,839 B2 | 6/2011 | Mcenaney et al. | |
| 8,527,156 B2 | 9/2013 | Martin et al. | |
| 9,290,093 B2 | 3/2016 | Turner et al. | |
| 11,155,166 B2 | 10/2021 | Cobo et al. | |
| 2003/0011984 A1* | 1/2003 | Chu | H05K 7/20836 |
| | | | 361/679.48 |
| 2014/0292245 A1* | 10/2014 | Suzuki | B25F 5/00 |
| | | | 318/478 |
| 2016/0050712 A1* | 2/2016 | Kim | H04W 52/0287 |
| | | | 370/311 |
| 2017/0099638 A1* | 4/2017 | Kim | H04W 52/0261 |
| 2021/0316713 A1 | 10/2021 | Vilar et al. | |
| 2022/0228348 A1 | 7/2022 | Vilar et al. | |
| 2024/0219990 A1* | 7/2024 | Dekel | H04N 23/651 |

FOREIGN PATENT DOCUMENTS

| | | | | |
|---|---|---|---|---|
| DE | 102010051963 A1 * | 5/2012 | ......... | F02D 41/0205 |
| DE | 102015004751 A1 | 10/2015 | | |
| DE | 102021131585 A1 | 6/2023 | | |
| WO | WO-2017207982 A1 * | 12/2017 | ............. | B60K 28/04 |

* cited by examiner

ELECTRIC WORK MACHINE WITH A SYSTEM AND METHOD OF CONSERVING POWER

TECHNICAL FIELD

The disclosure generally relates to an electric work machine with a system and method of conserving power.

BACKGROUND

Battery powered work machines include various onboard systems that draw power during both operative and inoperative states. Depending on the operating conditions, the power drawn from the battery can vary based on the type of work machine used, the type of implement used, and the execution of various tasks. There is an ongoing need in the field of such working machines to reduce diesel emissions, while still providing the requisite performance. The potential benefit of an all-electric or hybrid work machine include not only the reduction in emissions of nitrogen oxides and particulates, but also reductions in work machine service times and noise at the worksite. However, existing battery units have a relatively low performance ceiling relative to the energy demand of heavy work machines. Most batteries can only sustain operations for a portion of the workday, and charging generally mandates an extended downtime typically not required of diesel work machines. To minimize the electrical load and maximize the run time during operations, an automated system and method to manage the subsystems is desirable.

SUMMARY

An electric work machine with a system and method for conserving power is disclosed. The work machine comprises a cab, a battery, an auxiliary operations system operatively coupled to the battery, a cab occupant sensor, and a controller. The cab occupant sensor is operable to sense data 114 associated with an occupancy of the cab by an operator. The controller is communicatively coupled with the cab occupant sensor. The controller comprises a processor and a memory having a power conserving algorithm thereon, wherein the operator is operable to execute the power conserving algorithm to do the following. In a first step, the power conserving algorithm identifies a cab inoccupancy condition from data related to an occupancy of the cab wherein the cab inoccupancy condition indicates that the cab is unoccupied. The algorithm then automatically initiates a low power mode by derating the auxiliary operations system to a first degree when the cab inoccupancy condition is fulfilled.

The low power mode includes the processor executing the power conserving algorithm to further derate the auxiliary operations system to a second degree when the low power mode has been active in the first degree for a first defined period of time.

The low power mode includes the processor executing the power conserving algorithm to further derate the auxiliary operations system to a baseline degree when the low power mode has been active in the second degree for a second defined period of time. The lower power mode includes the processor executing the power conserving algorithm to terminate the low power mode upon an occupant occupying the cab.

The work machine further comprises an electric motor coupled to the battery, wherein the low power mode is enabled only upon the battery reaching a first charge depletion threshold and the electric motor is off.

The cab occupant sensor may comprise of an optical sensor positioned to capture an image of an area disposed within the cab. The cab occupant sensor may comprise of a force sensor coupled to an interior surface of the cab and operable to detect data related to a force applied to the surface as an occupant enter the cab.

Derating the auxiliary operations system to the first degree comprises one of disabling a radio receiver, disabling a wiper, disabling a location receiver, and disabling a light.

Derating the auxiliary operations system to the second degree comprises disabling a cabin temperature control system.

The low power mode derates the auxiliary operations system to the baseline degree only when the battery reaches a second charge depletion threshold, wherein the second charge depletion threshold includes a lower state of charge of the battery than the first charge depletion threshold.

The low power mode derates the auxiliary operations system to the second degree only when the ambient temperature is within a defined temperature rage.

Now turning to a method of conserving power on an electric work machine comprises the following steps. In a first step, the method includes identifying a cab inoccupancy condition from data related to an occupancy of the cab wherein the cab inoccupancy condition indicates that an occupant of the cab is not present. In a next step, the method includes automatically initiating a low power mode to a first degree by derating a first subset of the auxiliary operations to when the cab inoccupancy condition is fulfilled. Then the method includes automatically initiating a low power mode to a second degree by further derating a second subset of auxiliary operations when the low power mode has been active in the first degree for a first period of time.

The method may further include automatically initiating a low power mode by further derating the auxiliary operations system to a baseline degree when the low power mode has been active in the second degree for a second defined period of time.

The method may include terminating the low power mode upon an occupant occupying the cab.

The above features and advantages and other features and advantages of the present teachings are readily apparent from the following detailed description of the best modes for carrying out the teachings when taken in connection with the accompanying drawings.

BRIEF DESCRIPTION OF THE DRAWINGS

Numerous objects, features, and advantages of the embodiment set forth herein will be readily apparent to those skilled in the art upon reading of the following disclosure when taken in conjunction with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise.

As used herein, unless otherwise limited or modified, lists with elements that are separated by conjunctive terms (e.g., "and") and that are also preceded by the phrase "one or more of" or "at least one of" indicate configurations or arrangements that potentially include individual elements of the list, or any combination thereof. For example, "at least one of A, B, and C" or "one or more of A, B, and C" indicates the possibilities of only A, only B, only C, or any combination of two or more of A, B, and C (e.g., A and B; B and C; A and C; or A, B, and C).

As such, a method may be embodied as a program or algorithm operable on a controller 116. It should be appreciated that the controller 116 may include any device capable of analyzing data from various sensors, comparing data, making decisions, and executing the required tasks.

Figure 1:
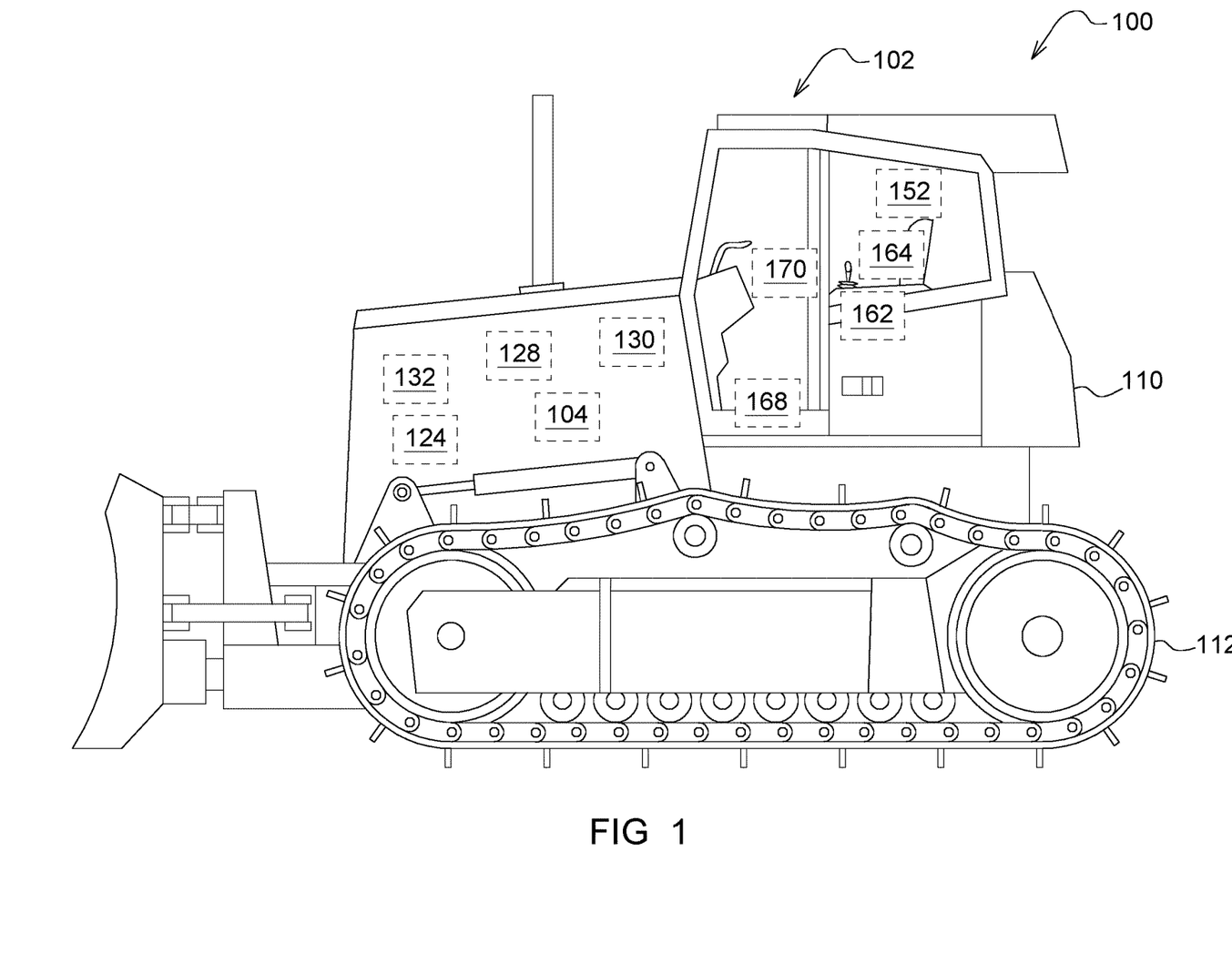
FIG. 1 is a side view of an all-electric loader incorporating an embodiment of the work machine disclosed herein.

Referring now to the drawings and particularly to FIG. 1, a representative work machine 100 is shown as a loader. The system and method disclosed herein may be applicable to other electric work machines with a cab in the agricultural, construction, forestry fields. FIG. 1 shows a side view of a work machine 100. The work machine 100 comprises a cab 102, a battery 104, an auxiliary operations system 106 operatively coupled to the battery 104, a cab occupant sensor 108 operable to sense data 114 associated with an occupancy of the cab 102 by an operator, and a controller 116. The controller 116 is communicatively coupled with the battery 104 and the cab occupant sensor 108.

The operator cab 102 includes an operator station coupled to a frame 110 of the work machine 100 wherein the frame 110 is supported by a ground-engaging mechanism 112. The operator cab 102 can include numerous conventional forms, for example, one or more user interfaces such as a display unit, foot pedals, steering wheel, joysticks, and any other controls necessary to operate the work machine 100. The embodiment of the operator cab 102 is shown as an enclosed operator station. However, the operator cab 102 includes alternative embodiments such as a platform for stationing an operator with user controls that does not include an enclosure or includes only a partial enclosure.

The battery 104 or "battery unit" as disclosed herein may encompass various forms of energy storage including, for example, lithium, supercapacitors, electrolytic capacitors, hybrid capacitors, and the like, which may have varying charge and discharge cycles but are otherwise capable of storing sufficient energy for operating a work machine 100 over a period of time. The battery unit 104 may be configured to operate with a state of charge 126 of anywhere between 0% and 100% of a maximum charge. In various embodiments, as disclosed herein, the battery unit 104 may be the primary power source for an electric motor 124 and auxiliary operation systems 106 for the work machine 100. In alternative embodiments, a hybrid configuration may be within the scope of the present disclosure where the battery unit 104 is used in conjunction with an engine-driven AC generator. The controller 116 may monitor a state of charge 126 of the battery unit 104 and other elements associated with the state of charge 126 (e.g. the percentage of a maximum electric charge being held by the battery unit 104, the temperature associated with the battery unit 104, the temperature associated with the power converter in communication with an implement coupled to the work machine 100, to name a few). At least one monitored parameter may be used to ascertain the load 125 on the battery unit 104 and the state of charge 126 of the energy storage device 104. The controller 116 may determine a degree of capacity of the battery unit 104, if not fully charged.

Figure 2:
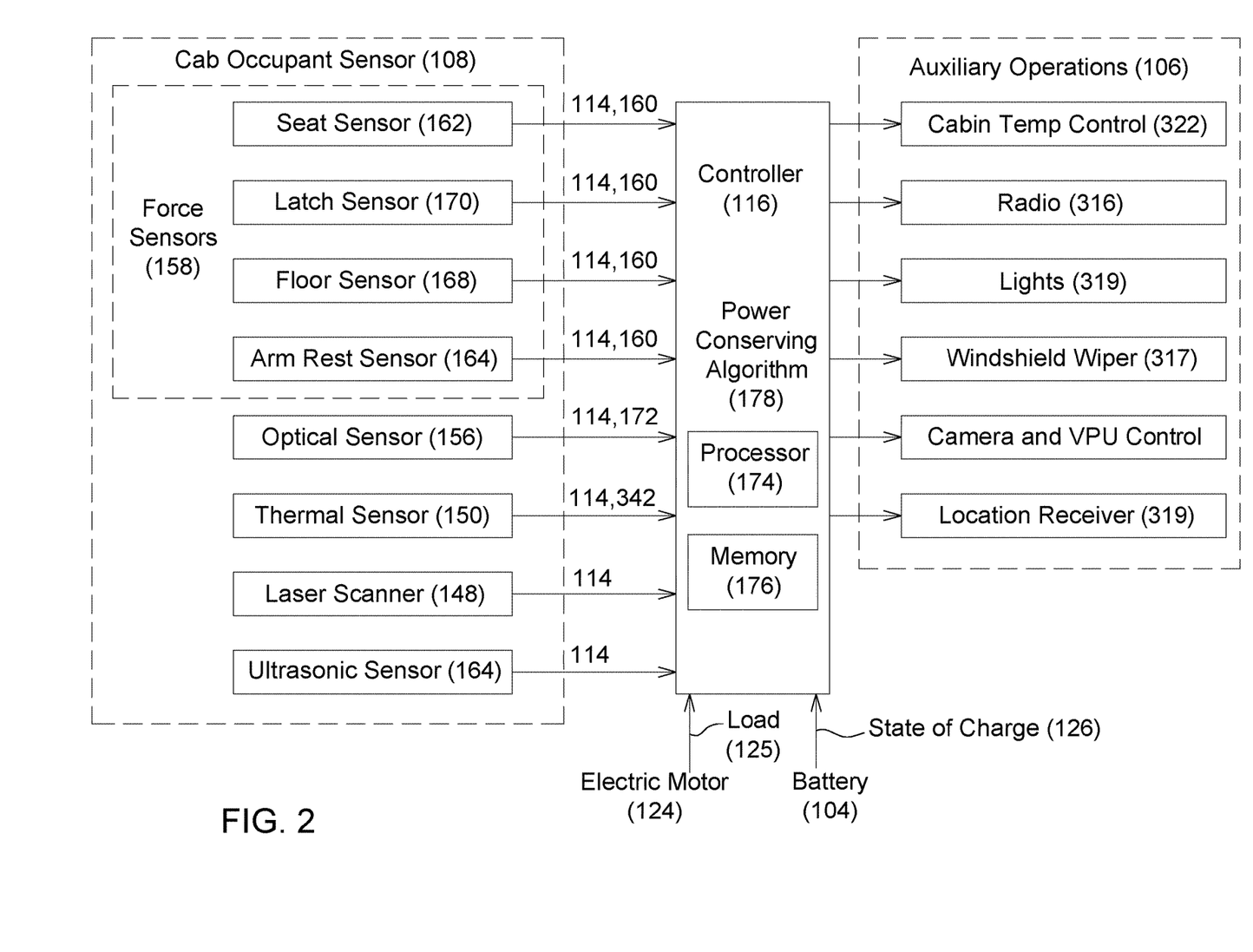
FIG. 2 is a block diagram representing an exemplary control system for the work machine in FIG. 1.

The auxiliary operations system 106 comprises of subsystems that are powered by the battery unit 104, and can be controllably activated, deactivated, or adjusted. The auxiliary operations system 106 can include a cabin temperature control system 322 which includes can include an electrically powered fan, an air conditioning unit 128, one or more heaters 130, and/or electrical pumps 132 that can be used to pump fluid to maintain certain temperatures. The controller 116 is configured to receive data 114 associated with the occupancy of the cab 102 from some or all of various sensors collectively defining a sensor system. Certain of these sensors may be provided to detect machine operating conditions or positioning, including for example an orientation sensor, global positioning system (GPS) sensors, vehicle speed sensors, vehicle implement positioning sensors, and the like, and whereas one or more of these sensors may be discrete in nature, the sensor system may further refer to output signals provided from the controller 116. Other sensors in the sensor system may be provided to detect ambient conditions indicative of occupancy of the cab 102 of the work machine 100, and may include laser scanners 148, thermal sensors 150, optical sensors 156, ultrasonic sensors 154, and other devices. The types and combinations of sensors may vary for a type of work machine, work area, and/or application, but generally are provided and configured to optimize recognition of an operator or the absence of an operator in and around or encroaching the cab 102. Additionally, with respect to embodiments of the present disclosure, the sensor system may further include sensors configured to detect a load 125 and a state of charge 126 of the battery unit 104, collectively or for example as individual values for each of a plurality of batteries associated with a battery unit 104.

The cab occupant sensor 108, also coupled to the controller 116, is operable to sense data 114 associated with an occupancy of the cab 102 by an operator. This data 114 enables disabling of an auxiliary operation 106 or subsystem, if the operator is not occupying the cab. The cab occupant sensor 108 may operate passively by sensing the absence of an operator occupying the cab 102. Furthermore, it is contemplated that the cab occupancy sensor 108 may operate actively by sensing the presence of an occupant of the cab 102. The cab occupant sensor 108 may comprise of one or more sensor types and function simultaneously or in step for. The cab occupant sensor 108 may comprise of a force sensor 158 coupled to an interior surface of the cab 102 and operable to detect data 160 related to a force applied to the surface as an occupant enters the cab 102. For example, the force sensor 158 may comprise of a seat sensor 162 to detect when the operator is seated in the cab 102. In some cases, the force sensor 158 may include an arm rest sensor 164 or other restraining device sensor (e.g. a seat belt) that may be raised, lowered, or otherwise adjusted in order for the operator to exit or enter the cab 102. In another embodiment, the force sensor 158 may comprise of a sensor 166 coupled to a steering wheel, joystick, or foot pedal to detect an operator's engagement with the controls or user interface. In another alternative embodiment, the force sensor 168 may be coupled to the floor of the cab 102, wherein compression of a sensor (e.g. a spring or transducer) can detect a substantive downward force from an occupant's weight on the floor of the cab 102 indicative of an operator's presence. The force sensor 158 need not necessarily be located within the confines of the cab 102. In another embodiment, the force sensor 158 may include a latch sensor 170 coupled to a door latch indicating sensing if the door is opened or closed; or possibly detect an orientation of a locking latch positioned from an interior surface of the cab 102. A force sensor 158 advantageously allows sensing of an occupant's presence without requiring a steady state power source.

In another embodiment, where the cab occupant sensor 108 is operable to sense data 114 associated with an operator occupancy of the cab 102 comprises of an optical sensor 156 positioned to capture an image 172 of an area disposed within the cab 102. Alternatively, the optical sensor 156 may be positioned to capture an image 172 of an area disposed external to the cab 102, sensing when an operating is approaching. For example, changes in pixelation of an image may indicate the presence of an operator. Alternatively, the cab occupant sensor 108 may include a microphone (sound detection), a thermal sensor 150 (temperature differential detection), a radio frequency identification (RFID), or any other device that can be used to detect an availability or presence of an operator within the cab 102. In yet another embodiment, the cab occupant sensor 108 may comprise of data 114 associated with occupancy such a user interface sensor 166 comprising one of a touch screen, a joystick, a button, a foot pedal, or a steering wheel in use, or activated with a tactile force.

As used herein, "controller" 116 is intended to be used consistent with how the term is used by a person of skill in the art, and refers to a computing component with processing, memory, and communication capabilities, which is utilized to execute instructions (i.e., stored on the memory or received via the communication capabilities) to control or communicate with one or more other components. In certain embodiments, the controller 116 may be configured to receive input signals in various formats (e.g., hydraulic signals, voltage signals, current signals, CAN messages, optical signals, radio signals), and to output command or communication signals in various formats (e.g., hydraulic signals, voltage signals, current signals, CAN messages, optical signals, radio signals).

The controller 116 may be in communication with other components on the work machine 100, such as hydraulic components, electrical components, and operator inputs within an operator station of an associated work machine 100. The controller may be electrically connected to these other components by a wiring harness such that messages, commands, and electrical power may be transmitted between the controller 116 and the other components. Although the controller 116 is referenced in the singular, in alternative embodiments the configuration and functionality described herein can be split across multiple devices using techniques known to a person of ordinary skill in the art. The controller 116 includes the tangible, non-transitory memory 176 on which are recorded computer-executable instructions, including a predictive maintenance for a track chain undercarriage algorithm. The processor 174 of the controller 116 is configured for executing the power conserving algorithm 178.

The controller 116 may be embodied as one or multiple digital computers or host machines each having one or more processors, read only memory (ROM), random access memory (RAM), electrically-programmable read only memory (EPROM), optical drives, magnetic drives, etc., a high-speed clock, analog-to-digital (A/D) circuitry, digital-to-analog (D/A) circuitry, and any required input/output (I/O) circuitry, I/O devices, and communication interfaces, as well as signal conditioning and buffer electronics.

The computer-readable memory 176 may include any non-transitory/tangible medium which participates in providing data or computer-readable instructions. The memory 176 may be non-volatile or volatile. Non-volatile media may include, for example, optical or magnetic disks and other persistent memory. Example volatile media may include dynamic random-access memory (DRAM), which may constitute a main memory. Other examples of embodiments for memory include a floppy, flexible disk, or hard disk, magnetic tape or other magnetic medium, a CD-ROM, DVD, and/or any other optical medium, as well as other possible memory devices such as flash memory.

Figure 3:
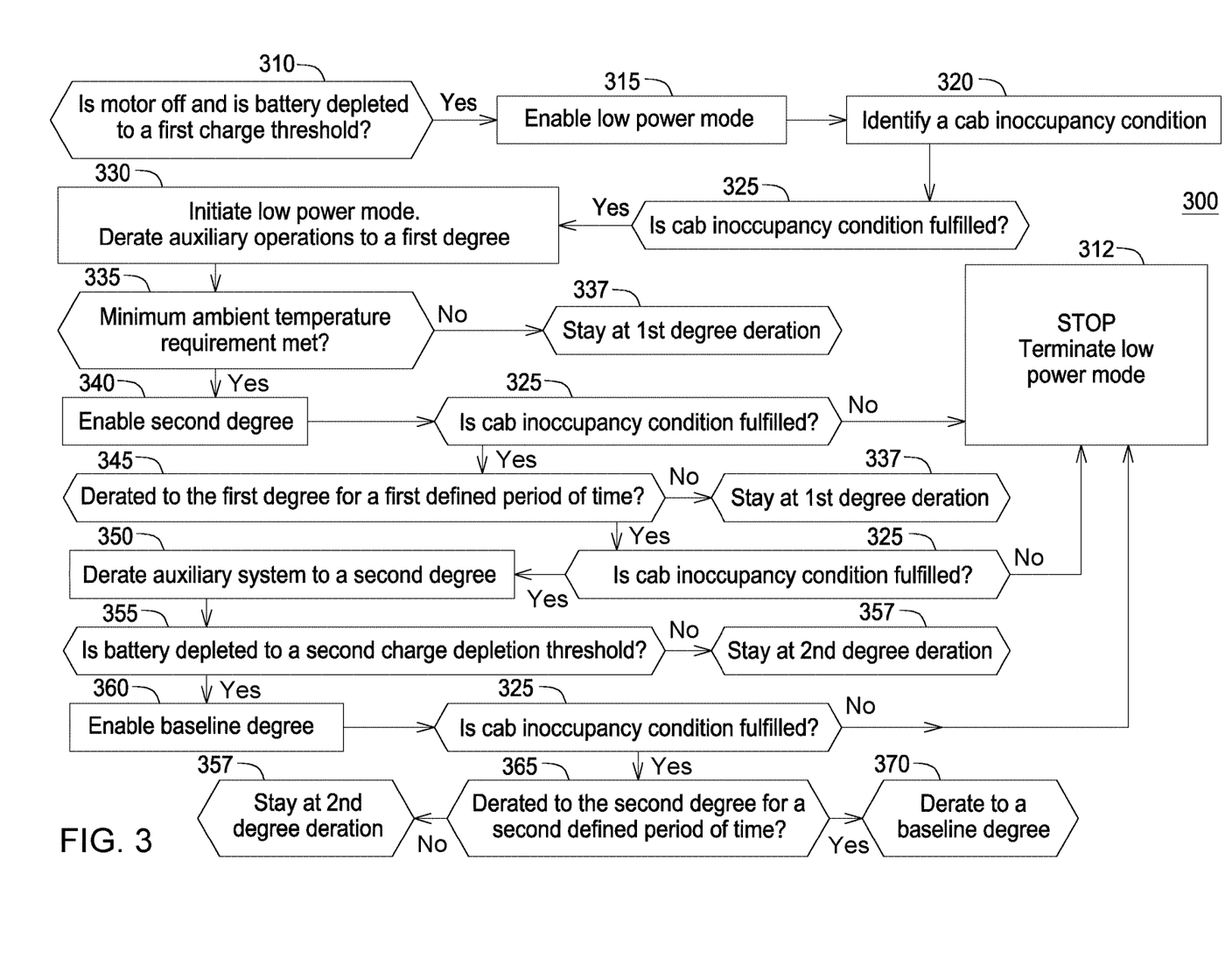
FIG. 3 is a flow diagram representing how the work machine operates with low power mode in conserving energy.

The controller 116 comprises of a processor 174 and a memory 176 having a power conserving algorithm 178 thereon, wherein the processor 174 is operable to execute the power conserving algorithm 178 to identify a cab inoccupancy condition and automatically initiate a low power mode 182 be derating the auxiliary operations system 106 when the cab inoccupancy condition 180 is fulfilled. FIG. 3 discloses an exemplary flowchart of steps or a method 300 taken by the processor 174 in executing the power conserving algorithm 178. In a first step 310, the processor 174 confirms if the electric motor 124 is off, and the battery 104 is sufficiently depleted to at least a first charge depletion threshold 331. The first charge depletion threshold 331 can be an absolute percentage of a state of charge, a range of a state of charge 126, or a minimum power capacity of a group of batteries, or a battery unit 104.

Upon meeting this criteria, in step 315, the low power mode 182 is enabled. When the low power mode 182 is enabled, in step 320, the processor may look for (i.e. actively) or passively identify a cab inoccupancy condition 180. The cab inoccupancy condition 180 may vary depending on the type of work machine, the intended operation of the work machine, or the status of a combination of data from one or more cab occupant sensors 108 depending on current weather and lighting conditions. For example, an optical sensor 156 may not provide sufficient data 114 associated the occupancy of the cab at night. In another example, a thermal sensor 150 may not provide sufficient data 114 associated with the occupancy of the cab in hot weather. Whereas the intended operation of the work machine may be indicative of the power required to complete a job function upon resuming operations on the current state of charge 126. Therein, the processor 174 identifies a dynamic value for data 114 associated with the cab inoccupancy condition 180 using additional data variables such as learned work machine patterns, worksite terrain, environmental conditions, and volume of operations remaining. In another embodiment, the processor 174 may identify a static value for data 114 associated with the cab inoccupancy condition 180 preset from a dealer or manufacturer, depending on a customer's historical use data, local environmental conditions, and a volume of work machines available per worksite.

In step 325 when the cab inoccupancy condition 180 is fulfilled, the processor 174 automatically initiates the low power mode 182 and derates the auxiliary operations system 106 to a first degree in step 330. The cab inoccupancy condition 180 is fulfilled from data identified from a multitude of ways. For example, the fulfillment of the cab inoccupancy condition 180 may be identifiable from the presence of data 114 associated with the occupancy of the cab 102, presence of data 114 associated with inoccupancy of the cab, the absence of data 114 associated with the occupancy of the cab, or the absence of data 114 associated with the inoccupancy of the cab. The one or more cab occupancy sensors 108 outputs this data to the controller 116 further effectuating the following steps.

In one exemplary embodiment, derating the auxiliary operations systems 106 to the first degree 315 comprises one or more of disabling a radio receiver 316, disabling a wiper 317, disabling a location receiver 318, and disabling a light 319.

Figure 4:
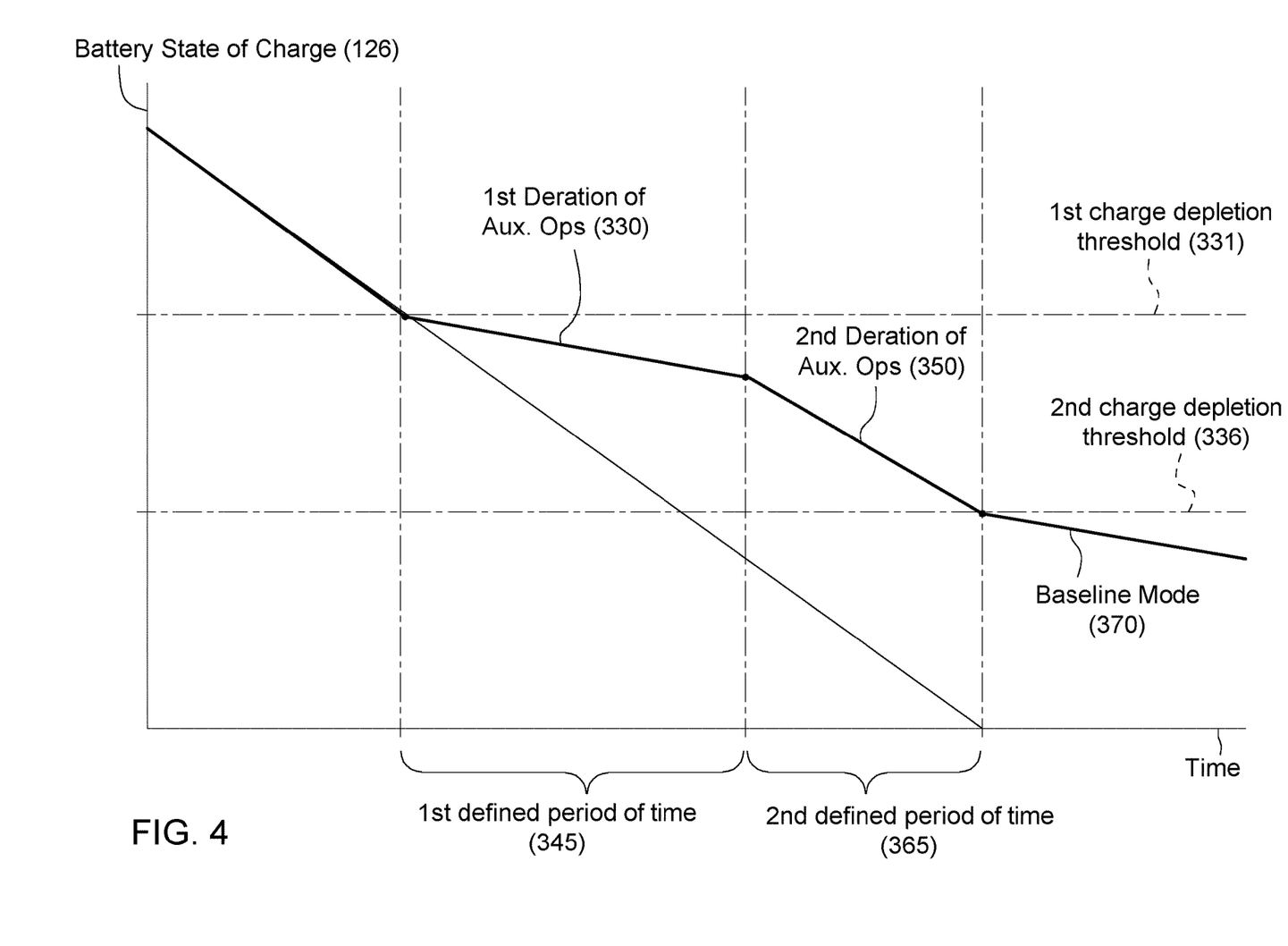
FIG. 4 is a graphic illustration of one example of the state of charge of battery in applying the low power mode over time with a cab inoccupancy condition.

In steps 345 and 370, the low power mode 182 may include the processor 174 174 executing the power conserving algorithm 178 to further derate the auxiliary operations systems 106. However, other conditions may be required to enable further deration. In step 335, the processor 174 may confirm if the ambient temperature requirements are met. If the ambient temperature 335 falls outside a defined range, the processor 174 maintains the low power mode 182 at the first degree deration. If the ambient temperature conditions 335 are met, the processor 174 enables deration to a second degree. Operating temperatures for electric work machine batteries may yield a sub-optimal performance when stored outside a defined temperature range. For example, cold temperatures may adversely impact charge rates of the battery 104 because of slowed chemical reactions of the battery 104. Furthermore, unlike gas-powered engines, batteries do not generate their own heat. Auxiliary operations systems 106 associated with the start of an electric work machine may require power to run a defroster, or a warm the onboard electrical systems and hydraulic fluids. Furthermore, maintaining battery temperature generally take less energy than reheating The power conserving algorithm 178 advantageously optimizes the use of power by limiting the deration of heating and cooling functions 345 of the work machine 100. As shown in FIG. 4, steps 345 and 350, deration of the auxiliary operations system to 106 a second degree only occurs when the cab inoccupancy condition 180 remains unfulfilled and the first defined period of time 345 in the first degree deration is met.

As shown in step 355, another condition that must be met prior to further deration of the auxiliary operations system 106 to a baseline degree 370, includes determining if the battery 104 is depleted to a second charge depletion threshold 336. If not, the processor 174 maintains the low power mode in the second degree by not enabling the processor 174 to downshift the auxiliary operations system 106 as shown in step 357. Derating the auxiliary operations system 106 to the second degree may comprise of disabling a cabin temperature control system and shown in step 350. For example, the cabin temperature control system 322 may shut down or otherwise enable a set point to deviate a configurable amount from a normal operating range. However, if the conditions of step 355 wherein the battery 104 is depleted to a second charge depletion threshold 336, step 325 wherein the cab inoccupancy condition 180 is maintained, and step 365 wherein a second defined period of time 365 in low power mode 182 is met, the processor 174 then derates the auxiliary operations systemin the low power mode 182 to a baseline degree in step 370. Derating the auxiliary operations system 106 to the baseline degree 370 may comprise of disabling all auxiliary operations systems 106 outside of those required for start-up of the electric motor 124.

In all of the aforementioned steps and the following steps, if at any time the cab inoccupancy condition 180 is no longer fulfilled as, or any other applicable requirements (e.g. ambient temperature range), the processor 174 terminates the low power mode 182, as shown in step 312.

The low power mode 182 may include the processor 174 executing the power conservation algorithm 178 to terminate the low power mode 182 upon an occupant 326 occupying the cab 102, wherein occupancy of the cab 102 may be identified using data 114 associated with occupancy of the cab 102 derived from the cab occupancy sensor 108. In one embodiment, the cab occupant sensor 108 may comprise of a two-step confirmation, wherein a force sensor 158 (that does not require a constant power draw) initiates an active monitoring to confirm the presence of an occupant from a secondary sensor that may require a power draw from the battery 104.

FIG. 4 is a graphic illustration of one example of the state of charge 126 of the battery 104 in applying the low power mode 182 over time with a cab inoccupancy condition 180 in accordance with flow diagram disclosed in FIG. 3. The graphic illustration discloses the state of charge 126 over time when the cab inoccupancy condition 180 is fulfilled, and under the assumption that the battery 104 is not charging. As the processor 174 on the work machine enables low power mode 182, the various degrees of low power is shown based on the state of charge 126 of the battery 104, and defined durations of time the state of charge 126 the battery 104 may be in, as disclosed above.

Figure 5:
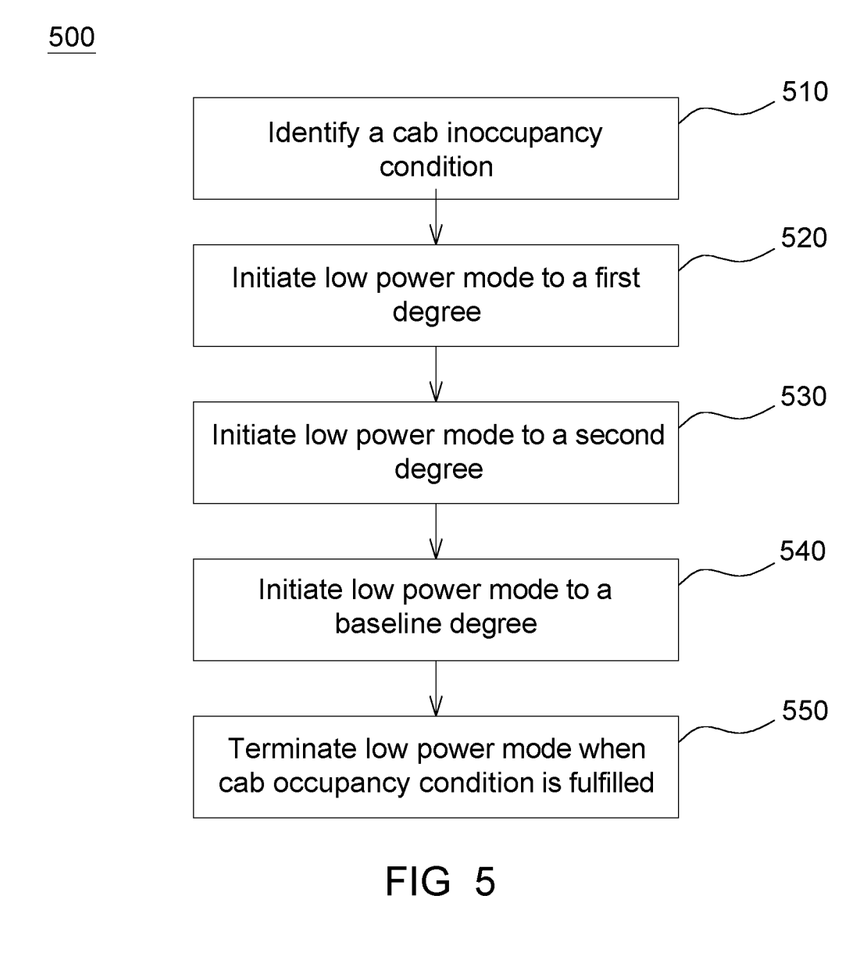
FIG. 5 is a block diagram of a method of conserving power on an electric work machine when the cab is unoccupied.

FIG. 5 is a block diagram of a method of conserving power on an electric work machine when the cab 102 is unoccupied. In step 510, the method includes identifying a cab inoccupancy condition 180 from data related to an occupancy of the cab 102 wherein the cab inoccupancy condition 180 indicates that an occupant of a cab 102 is not present. In a next step 520, the method includes automatically initiating a low power mode 182 to a first degree by derating a first subset of the auxiliary operations 106 to when the cab inoccupancy condition 180 is fulfilled. In step 530, the method then includes automatically initiating the low power mode 182 to a second degree by further derating a second subset of auxiliary operations 106 when the low power mode 182 has been active in the first degree for a first defined period of time 345. In step 540, the method may include automatically initiating a low power mode 182 to a baseline degree 370 by further derating the auxiliary operations 106 to a baseline subset when the low power mode 182 has been active in the second degree for a second defined period of time 365. Step 550 discloses terminating the low power mode 182 upon having a cab occupancy condition wherein the data related to the cab occupancy condition indicates that the occupant of the cab 102 is available.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

The invention claimed is:

1. A work machine comprising:
   a cab;
   a battery;
   an auxiliary operations system operatively coupled to the battery;
   a cab occupant sensor operable to sense a data associated with an occupancy of the cab by an operator; and
   a controller communicatively coupled with the cab occupant sensor, the controller comprising a processor and a memory having a power conserving algorithm thereon, wherein the processor is operable to execute the power conserving algorithm to:
      identify a cab inoccupancy condition from the data related to the occupancy of the cab wherein the cab inoccupancy condition indicates that the cab is unoccupied;
      automatically initiate a multi-stage low power mode by sequentially derating the auxiliary operations system a first degree, a second degree, and a baseline degree, wherein
   derating the auxiliary operations system to the first degree occurs only when the cab inoccupancy condition is fulfilled, the battery is below a first charge depletion threshold, and the motor is off;
   derating the auxiliary operations system to the second degree occurs only when the low power mode has been active in the first degree for a first defined period of time and an ambient temperature is within a defined range; and
   derating the auxiliary operation system to the baseline degree occurs only when the low power mode has been active in the second degree for a second defined period of time and the battery is below a second charge depletion threshold, the second threshold being lower than the first charge depletion threshold.

2. The work machine of claim 1, wherein the low power mode includes the processor executing the power conservation algorithm to terminate the low power mode upon an occupant occupying the cab.

3. The work machine of claim 1, wherein the cab occupant sensor comprises an optical sensor positioned to capture an image of an area disposed within the cab.

4. The work machine of claim 1, wherein the cab occupant sensor comprises a force sensor coupled to an interior surface of the cab and operable to detect a data related to a force applied to the surface as an occupant enters the cab.

5. The work machine of claim 1, wherein derating the auxiliary operations systems to the first degree comprises one of disabling a radio receiver, disabling a wiper, disabling a location receiver, and disabling a light.

6. The work machine of claim 1, wherein derating the auxiliary operations system to the second degree comprises disabling a cabin temperature control system.

7. A method of conserving power on an electric work machine, the method comprising:
   identifying a cab inoccupancy condition from a data related to an occupancy of the cab wherein the cab inoccupancy condition indicates that an occupant of a cab is not present;
   automatically initiating a multi-stage low power mode to a first degree by derating a first subset of the auxiliary operations to when the cab inoccupancy condition is fulfilled, the battery is below a first charge depletion threshold, and the motor is off;
   automatically initiating the low power mode to a second degree by further derating a second subset of auxiliary operations only when the low power mode has been active in the first degree for a first defined period of time and an ambient temperature is within a defined range; and
   automatically initiating a low power mode to a baseline degree by further derating the auxiliary operations system to a baseline subset when the low power mode has been active in the second degree for a second defined period of time, and when the battery reaches a second charge depletion threshold, wherein the second charge depletion includes a lower state of charge of the battery than the first charge depletion threshold.

8. The method of claim 7, further comprising:
   terminating the low power mode upon a cab occupancy condition wherein the data related to the cab occupancy condition indicates that the occupant of the cab is available.

9. The method of claim 7, wherein the data related to the occupancy of the cab is associated with an optical sensor positioned to capture an image of an area disposed within the cab.

10. The method of claim 7, wherein the data related to the occupancy of the cab is associated with a force sensor coupled to an interior surface of the cab and operable to detect data related to a force applied to the surface as an occupant enters the cab.

11. The method of claim 7, wherein derating the auxiliary operations systems to the first degree comprises one of disabling a radio receiver, disabling a wiper, disabling a location receiver, and disabling a light; and
   wherein derating the auxiliary operations system to the second degree comprises disabling a cabin temperature control system.

* * * * *